United States Patent Office 3,207,338
Patented Sept. 21, 1965

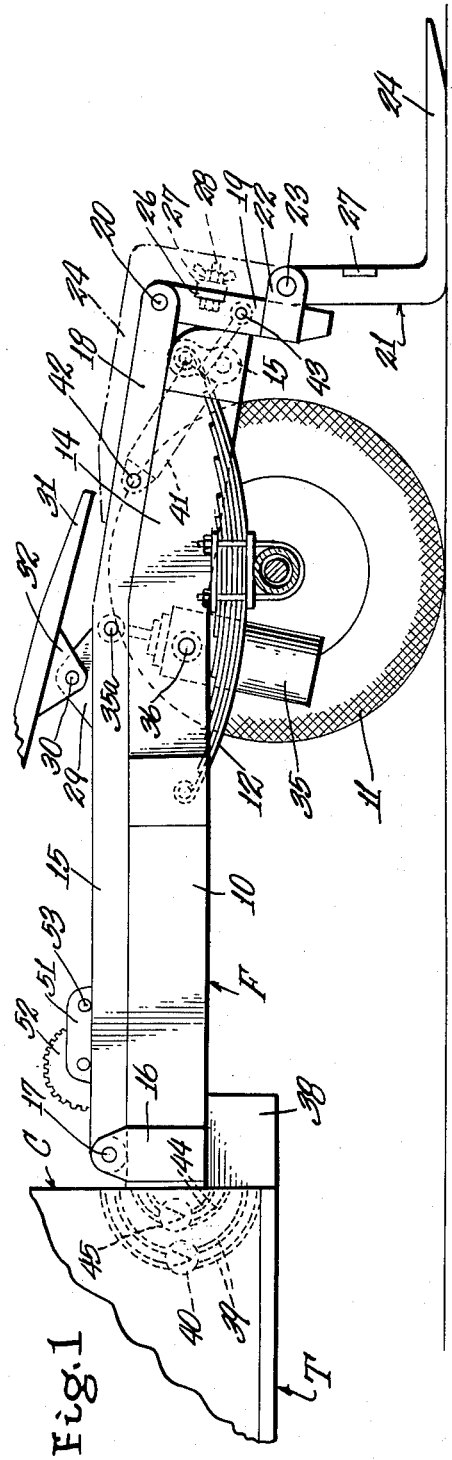

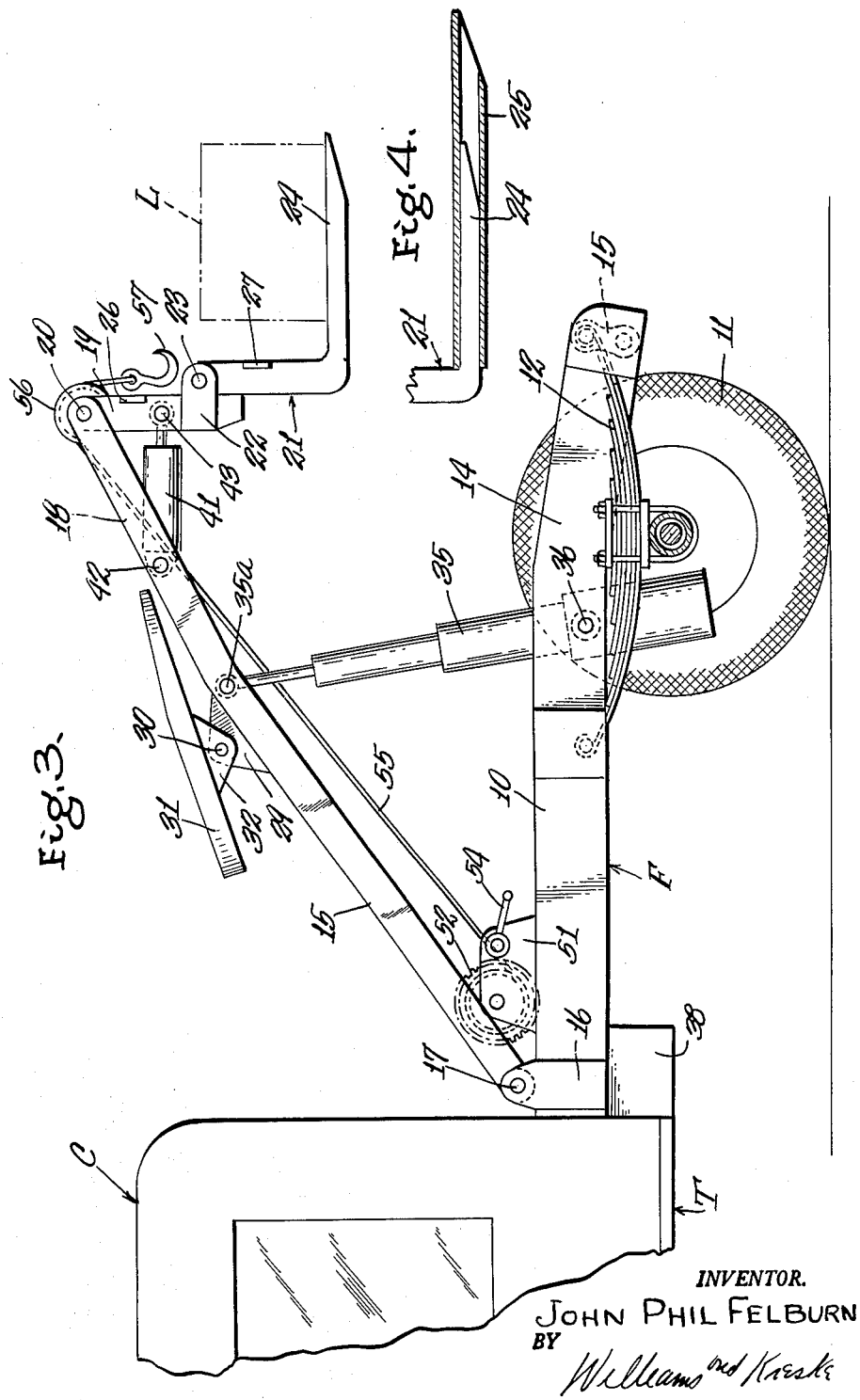

3,207,338
LIFT ATTACHMENTS FOR VEHICLES
John Phil Felburn, 4160 W. Broad St., Columbus, Ohio
Filed May 15, 1962, Ser. No. 194,950
12 Claims. (Cl. 214—131)

My invention relates to lift attachments for vehicles, more particularly to such attachments for tractors, and the principal object of my invention is to provide new and improved attachments of this character.

My invention is particularly adapted for use with tractors used for hauling semi-trailers and the like, and provides a lift attachment which is carried by the tractor and therefore is always available for use, regardless of the location of the tractor. Therefore, loading and unloading of the trailer is not confined to freight terminals and, as a consequence, greater flexibility is provided since heavy freight may now be loaded and unloaded at the plant of even the smallest manufacturer or shipper, with no particular need for docks, cranes and lift trucks.

Further, since the lift attachment is carried by the tractor and readily available, it may be used for emergency purposes, such as loading and unloading trailers which have broken down on the road, or in lifting and/or moving wreckage on the road. Inasmuch as the weight of the usual tractor is concentrated at the front end, the lift attachment of my invention is capable of lifting very heavy weights without danger of upending the tractor. A tractor equipped with an attachment of my invention is suitable for use not only as a trailer hauler but also as a wrecker, and therefore the tractor is equipped to perform a dual duty. For wrecking purposes, and for lifting wrecked automobiles from ditches and the like, the attachment may be provided with a cable and winch, the arms of the attachment acting as a gin pole. Other advantages will be apparent or suggested by the following description in connection with the appended drawings.

In the drawings accompanying this specification and forming a part of this application, there is shown, for purposes of illustration, an embodiment which my invention may assume, and in these drawings:

FIGURE 1 is a broken side elevational view of a tractor embodying my invention, the rear wheel of the tractor being removed to more clearly illustrate construction, and the lift attachment being disclosed in one position, FIGURE 2 is a broken top plan view of the construction illustrated in FIGURE 1, FIGURE 3 is a view similar to FIGURE 1 but showing the lift attachment in another position, and FIGURE 4 is a fragmentary view of the fork members with an extension attachment added.

My invention is herein illusrated in combination with a tractor T of any commercially available type, modified only as will be hereinafter pointed out. The usual tractor has a frame F including a pair of longitudinally extending laterally spaced frame members 10, 10 which are usually formed of steel channels and made quite sturdy to support the heavy loads normally imposed upon the tractor. The tractor also has a cab C, and front wheels and a motor (not shown).

At the rear of the tractor, rear wheels 11, 11 are supported from the frame members 10, 10 through the medium of the usual springs 12, 12. The rear portion 14 of each frame member 10 angles downward slightly for clearance purposes, the springs 12 being connected to the frame members 10 by usual shackle connections, the rear shackle 15 being inverted to accommodate the down-turned portion 14 of the frame members 10.

An arm 15 is pivoted to each frame member 10, the pivot being preferably close to the cab C to provide maximum length for the arm. The arm may be formed of any suitable metal and may have any desired cross-sectional shape. In the disclosed embodiment, one end of each arm 15 is pivoted between a pair of plates 16 which are welded to opposite sides of a frame member, a pin 17 extending between the plates to provide the pivot.

Each arm 15 overlies its respective frame member and in its lowermost position directly abuts the upper surface of the frame member so that the latter bears the weight of the load imposed upon the tractor by the semitrailer. The rear end of each harm 15 angles downwardly, as at 18, in correspondence with the rear portions 14 of the frame members 10, and the rear end of each arm extends beyond the rear end of the frame members and links 19, 19 have one end pivotally connected to the rear end of a respective arm. The pivot connection is formed by a rod 20 which extends between the arms to tie the two together and thus impart rigidity to the structure. The links 19, 19, hang downward and fork members 21, 21 are pivoted to the opposite end of respective links. A pair of plates 22 may be welded to opposite sides of each link and a rod 23 may be extended between the links 19, 19 to tie the two together and impart further rigidity. Opposite ends of the rod 23 pass through aligned holes in respective plates 22 and fork member to provide the pivot for the latter.

Each fork member 21 abuts its link 19 to limit swinging of the fork member in a clockwise direction, and each has a foot portion 24 which is engageable with a load L to lift the latter. In the event the foot portion 24 is not long enough an extension sleeve 25, as seen in FIGURE 4, may be slipped over each foot. When not in use, the sleeves may be carried by any suitable rack on the tractor.

When the tractor T is used for hauling a semi-trailer, the fork members 21 may be swung in a counterclockwise direction to a position overying the downwardly inclined arm portions 18, as seen in dot-dash lines in FIGURE 1. It will be seen that in this position, the upwardly directed surface of the foot portions 24 of the fork members provide a gradual incline which enables the tractor to be cammed under the fifth wheel plate of a semi-trailer, or under the undersurface of any other load. Angles 26, 27 may be welded in aligned position on the respective links 19 and fork members 21, bolts 28 passing through holes in the angles and a wing nut threaded on the bolts to hold the fork members in the dot-dash line position shown in FIGURE 1.

Each arm 15 has an upstanding ear 29 intermediate its length and a rod 30 is passed through aligned holes in the ears and fixed thereto to improve rigidity. A fifth wheel 31 has downwardly extending lugs 32 which correspond to the ears 29 and which receive opposite ends of the rod 30 to provide the horizontal pivot for the fifth wheel. The usual fifth wheel is normally overbalanced so that in free position it inclines downwardly, as seen in FIGURE 1, to cooperate with the incline of the upturned fork members 21 and thus assist in sliding the tractor under the semi-trailer or other load.

In the disclosed embodiment, two fluid cylinders 35, 35 are pivotally connected to a rod 35a which extends between the arms 15, the cylinders being adapted to shift the arms 15 vertically about their pivots 17. Each cylinder has a trunnion 36 pivotally connected to a respective arm, and a shaft 37 extends between the cylinders for strength purposes. A fluid power unit 38 may be carried by the tractor T at any suitable place, and fluid lines 39 lead from the power to the cylinders 35. A suitable valve 40 is provided to control flow of fluid to the cylinders, the valve preferably being located within the cab C of the tractor and readily accessible to the operator of the latter.

A fluid cylinder 41 has one end pivotally connected to a rod 42 which extends between and is connected to the downwardly inclined portion 18 of the arms 15. The other end of the cylinder, the rod end in this case, is pivotally connected to a rod 43 which extends between and is connected to the links 19. The fluid cylinder 41 is connected by fluid lines 44 to the power unit 38, a valve 45 being interposed in the lines to control operation of the cylinder.

As before pointed out, the fork members 21 abut the links 19 (see FIGURE 3) to limit swinging movement of the fork members in a clockwise direction and therefore the links and fork members are rigidly combined to support the load L. As the arms 15 are swung upwardly or downwardly, the angle of the links 19 with respect to the vertical will change correspondingly, and the tractor operator may manipulate the valve 45 to operate the cylinder 41 in accordance with any change of link angularity, so that the foot portions 24 of the fork members 21 may at all times be substantially horizontal.

When the tractor T is adapted for wrecking operations, it is preferable to rotatably support a drum 50 between plates 51 which are welded to the inside of respective frame members 10, 10 and in position to clear the arms 15, 15. Suitable gearing 52 is disposed between the shaft of drum 50 and a driver shaft 53, the latter shaft being operated by a crank 54, or by any suitable motor (not shown). The crank 54 may be detached from the shaft 53 to provide clearance for the adjoining arm when the latter is in down position. A cable 55 is wound on the drum, the free end of the cable being trained over a sheave 56 which is rotatably mounted on the rod 20. A suitable hoisting hook 57 may be attached to the end of the cable in the usual manner.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A lift attachment for a vehicle having a frame and wheels connected to and supporting said frame from a roadway, the improvement comprising arm means overlying said frame and having one end pivoted to the latter at a place spaced from the rear of the frame, load engaging and supporting means pivoted to the opposite end of said arm means and swingable vertically from a load engaging position to an out-of-the-way position overlying said arm means, and a fifth wheel carried by said arm means for connection to a trailer.

2. A lift attachment for a vehicle having a pair of longitudinally disposed laterally spaced frame members, and wheels connected to and supporting said frame members from a roadway, the improvement comprising a pair of arms overlying respective frame members, each arm having one end pivoted to a respective frame member at a place spaced from the rear end of said frame for vertical swinging movement, a fifth wheel carried by said arms, and load engaging fork members pivotally carried by the free ends of said arms.

3. The construction according to claim 2 wherein said fork members are swingable from load engaging position to an out-of-the-way position overlying respective arms.

4. The construction according to claim 2 wherein a pair of links have one end pivotally connected to the free ends of respective arms for vertical swinging movement and wherein said fork members are pivoted to the opposite end of respective links, and further including means for shifting said links to maintain a foot portion of said fork members in desired relation with respect to the horizontal.

5. A lift attachment for a power driven tractor for use in hauling a trailer having a fifth wheel plate, said tractor including a pair of longitudinally extending laterally spaced frame members and wheels fore and aft of said frame members for supporting the latter from a roadway, a pair of arms pivoted to respective frame members a substantial distance forwardly of the rear of said frame members so that the free ends of said arms are vertically swingable, a fifth wheel carried by said arms for connection with the fifth wheel plate of said trailer, a pair of links pivoted to free ends of respective arms, said links extending downwardly from said pivot connection at the rear of said frame members and the free ends of said links being vertically swingable, and a pair of fork members pivoted to the free ends of respective links and vertically swingable, said fork members being adapted to engage a load.

6. The construction according to claim 5 wherein said arms overlie and are longitudinally aligned with respective frame members, said arms abutting respective frame members in a lowered position wherein said fifth wheel is adapted for engagement with said fifth wheel plate.

7. The construction according to claim 5 wherein said fork members may be swung from a loading position to an out-of-the-way position overlying and bearing against said arm means, the upwardly directed surface of said fork members in said latter position inclining downwardly toward the rear to assist in sliding said fifth wheel plate to assembly with said fifth wheel.

8. The construction according to claim 5 including fluid cylinder means for moving said arms, and fluid cylinder means between said arms and said links for shifting the latter to maintain said fork members in a selected pivoted relation.

9. A lift attachment for a vehicle which has a frame providing longitudinally extending frame members in laterally spaced relation and wheels connected to and supporting said frame for movement along a roadway, the improvement comprising arm means providing a pair of arms in spaced, side-by-side relation extending longitudinally of and in one position overlying and resting upon respective frame members and one of the adjoining ends of said arms being pivoted to said frame at a place spaced forwardly of the rear of said frame, load engaging means supported from the adjoining opposite ends of said arms, means pivotally connected to said arms rearwardly of their pivot connection to said frame for elevating said arm means from its one position aforesaid, and a fifth wheel carried by said arms for connection to a trailer.

10. A trailer tractor having a lift attachment, said tractor including a frame having a pair of transversely spaced and longitudinally extending structural members, road engaging wheels at the front and rear of said frame and a cab at the front of said frame, a pair of arms, each closely overlying a respective structural member and having one end pivoted to its related structural member adjoining said cab and its other end overhanging the rear end of its related structural member, means for rotating said arms in unison about the arm pivots from a downward position wherein the swinging portion of said arms are supported on their related structural members to an elevated position, lifting fork means pivotally connected to said other overhanging end of said arms for engaging and supporting a load, and a hoisting cable trained over the pivot of said fork means, said cable having one end connected to a winding drum carried by said frame and the opposite end depending from said fork means pivot for hoisting purposes.

11. A trailer tractor having a lift attachment, said tractor including a frame having a pair of transversely spaced and longitudinally extending structural members, road engaging wheels at the front and rear of said frame and a cab at the front of said frame, a pair of arms, each closely overlying a respective structural member and having one end pivoted to its related structural member adjoining said cab and its other end overhanging the rear end of its related structural member, means for rotating said arms in unison about the arm pivots from a downward position wherein the swinging portion of said arms are supported on their related structural members to an elevated position, lifting fork means pivotally connected to said other overhanging end of said arms for engaging and supporting a load, and a fifth wheel swingable about an axle extending crosswise of said arms and in unloaded condition urged to tilt downwardly toward the rear of the trailer, the rear portion of each structural member being inclined downwardly and the rear end of each arm being inclined downwardly a corresponding amount and in downward position closely overlying the adjoining portion of the related structural member, the upwardly extending surfaces of said arms in downward position providing cam surfaces along which the fifth wheel plate of a trailer may slide and thus be guided to sliding engagement with said tractor fifth wheel.

12. The construction according to claim 11 wherein said lifting fork means comprises a fork member at each arm, each fork member being pivotable to an out-of-the-way position wherein it overlies the adjoining portion of its related arm, the upwardly directed surfaces of said fork members in this case providing the cam surface for guiding said fifth wheel plate to said fifth wheel.

References Cited by the Examiner
UNITED STATES PATENTS

| | | | |
|---|---|---|---|
| 2,190,258 | 2/40 | Colorigh | 214—523 |
| 2,691,451 | 10/54 | Westfall | 214—523 X |
| 2,782,054 | 2/57 | Nelson | 214—671 X |
| 2,788,909 | 4/57 | Kughler | 214—620 |
| 2,820,561 | 1/58 | Meagher | 214—620 |
| 2,847,230 | 8/58 | Hendrickson et al. | 280—438 X |
| 2,860,793 | 11/58 | Lapsley. | |
| 2,906,545 | 9/59 | Page | 280—438 |
| 2,910,203 | 10/59 | Todd | 214—672 |
| 2,990,072 | 6/61 | Mindrum | 214—140 X |
| 3,033,400 | 5/62 | Smith | 214—672 |
| 3,053,405 | 9/62 | Holmberg et al. | 214—620 |

HUGO O. SCHULZ, *Primary Examiner.*
GERALD M. FORLENZA, *Examiner.*